Dec. 16, 1924.  
S. F. DOUGLASS  
MOTOR VEHICLE SIGNAL  
Filed Feb. 21, 1922  
1,519,980  
2 Sheets-Sheet 2
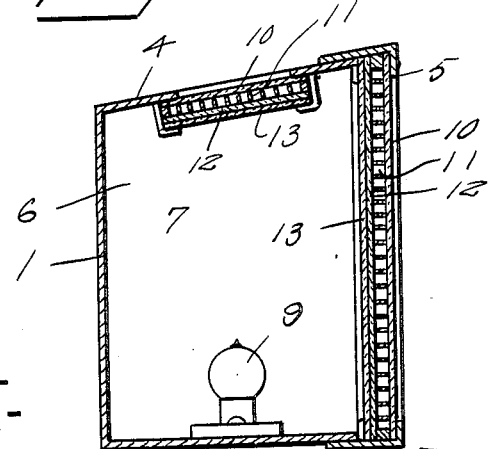
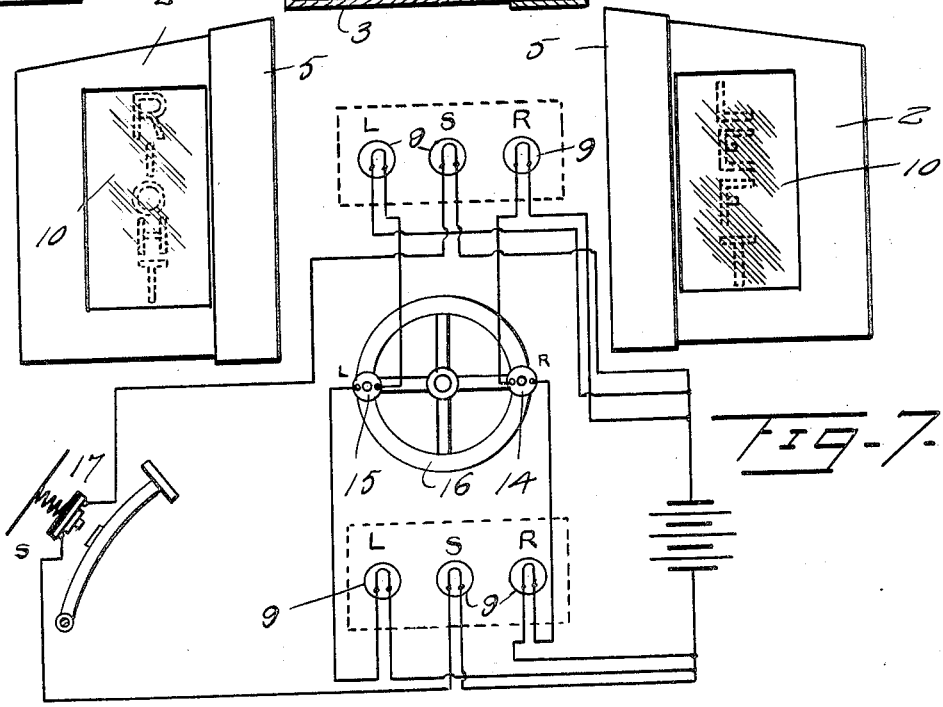
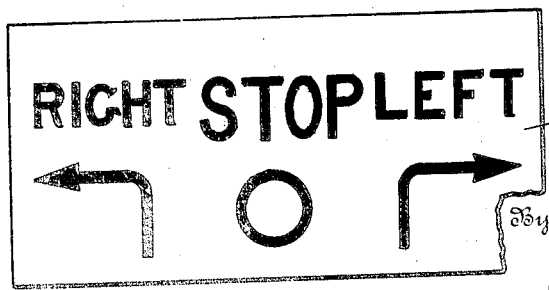
Inventor  
S. F. Douglass Patented Dec. 16, 1924.

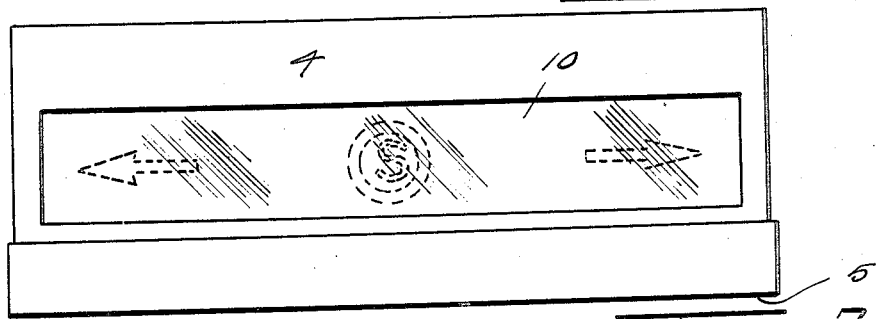
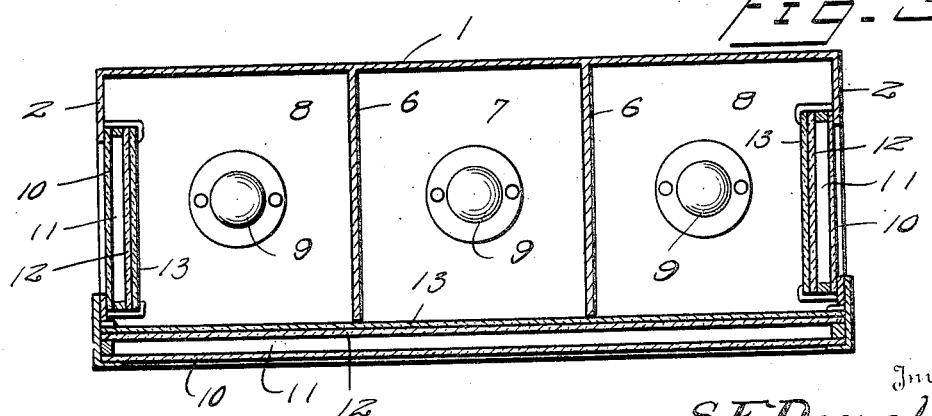

1,519,980

UNITED STATES PATENT OFFICE.

SAMUEL F. DOUGLASS, OF PRAIRIE DU ROCHER, ILLINOIS.

MOTOR-VEHICLE SIGNAL.

Application filed February 21, 1922. Serial No. 538,169.

*To all whom it may concern:*

Be it known that I, SAMUEL F. DOUGLASS, a citizen of the United States, residing at Prairie du Rocher, in the county of Randolph and State of Illinois, have invented certain new and useful Improvements in Motor-Vehicle Signals; and I do hereby declare the following to be a full, clear, and exact description of the invention, such as will enable others skilled in the art to which it appertains to make and use the same.

This invention has relation to traffic signaling means whereby the driver of a motor vehicle may signal his intention when about to turn or stop, thereby giving ample warning to pedestrians and drivers of other vehicles, whereby to avoid confusion and a possible casualty.

The invention contemplates a signal disposed at the front and in the rear of the vehicle and visible from the sides and in front and in the rear of the vehicle, thereby affording a measure of protection and providing for any possible dispute as to the display of the proper signal in the event of a casualty, the directional signaling means being controllable from the steering wheel and the stop signal being operable from the vehicle control, such as the brake or clutch pedal.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a front view of a signal embodying the invention,

Figure 2 is a top plan view thereof,

Figure 3 is a section on the line 3—3 of Figure 1, looking in the direction of the arrows, Figure 4 is a transverse section on the line 4—4 of Figure 1, looking to the right as designated by the arrows, Figures 5 and 6 are opposite end views of the signal, Figure 7 is a diagrammatic view, and Figure 8 is a front view of the plate bearing direction indicia.

Corresponding and like parts are referred to in the following description and designated in the several views of the drawings by like reference characters.

In accordance with the present invention, the signal is disposed in front of the vehicle and in the rear thereof, both signals being of like or similar construction and a detailed description of one is sufficient for a full understanding of each.

The signal comprises a casing which is preferably of oblong and rectangular form, said casing comprising a back 1, ends 2, a bottom 3, a top 4 and a front 5. The top 4 and front 5 are preferably removable to admit of ready access to the interior of the casing for any desired purpose. Partitions 6 divide the casing into a middle and end compartments 7 and 8, respectively. Each of these compartments contains a lamp 9 which is of the electric type and included in a circuit which is controllable by the driver of the vehicle. The middle compartment 7 corresponds with the stop signal and the end compartments 8 correspond with the directional signals, whereby to indicate the intention of the driver when about to make a turn either to the right or to the left. The top 4, front 5 and ends 2 are of such construction as to display the required signals according to the intention of the driver.

The front 5 comprises a plurality of elements such as a plate 10 of glass or other transparent material, a screen 11 comprising a plurality of thin metal slats, a plate 12 of translucent material, such as celluloid, and a plate 13 which may consist of plain or colored celluloid, or ground glass. The metal slats of screen 11 are painted a flat black and are sufficiently close together, as shown, to prevent the sunlight in the daytime from shining on the signals so that when lighted the signals are visible in the daytime as well as at night. These several elements are arranged in the order indicated and the innermost plate 13 is the signal plate and bears the indicia for conveying the desired information, whereby the intention of the driver may be made known and pedestrians and drivers of other vehicles govern themselves accordingly. The top 4 and ends 2 are provided with openings and these openings are covered by elements corresponding to the parts 10, 11, 12 and 13 of the front, the innermost element 13 bearing the signal data, such as words or characters, or a combination of the two. The end compartment 8, corresponding with and appearing toward the left of the machine, has the word "Left" on the end wall 2 and on the left hand end of the front 5, and the right hand compartment 8 has the word "Right" on its end wall 2 and the right hand end of the front 5. Corresponding end portions of the front 5 bear indicating characters in addition to the words, such as arrows, which point to the right and left to indicate the required direction. The middle compartment 7 of the casing has the words "Slow" or "Stop" on the middle portion of the front 5 and in addition to these words has a character such as a circle. The middle portion of the top 4 discloses a corresponding character with the middle portion of the front 5, the same consisting of a circle enclosing the letter "S" which indicates "Stop." Opposite ends of the top 4 bear indicating characters, such as arrows, which point in the same direction as the arrows on the corresponding ends of the front 5. The front signal is so disposed that the driver of the vehicle may at all times observe the top of the casing, whereby the characters borne thereby may be observed so that the nature of the signal displayed may be known by the driver and thereby obviate any possible mistake or failure to display the signal when required.

Push buttons 14 and 15 are applied to the steering wheel 16 and control circuits including the lamps 9 in the end compartments 8. When the push button 14 is operated, the circuit including the lamp in the right hand compartment 8 is closed, thereby illuminating said compartment and displaying the word "Right" which may be seen from the side or in front or in the rear of the machine. The top of said compartment is likewise illuminated and the indicating character corresponding therewith made visible so that the driver may know that the proper signal has been displayed. When the push button 15 is operated, the circuit including the lamp in the left hand compartment 8 is closed, thereby illuminating said compartment and displaying the word "Left" which may be read from a point in front of, at the side or in the rear of the vehicle. The top of said compartment is likewise illuminated so that the characters corresponding therewith may be observed by the driver who is thus informed that the proper signal has been displayed.

A push button 17 is located in the path of the brake or clutch pedal to be operated thereby when said pedal is moved, thereby closing the circuit including the lamp 9 in the middle compartment 7, whereby the words "Slow" and "Stop" are rendered visible and at the same time lighting the top of said middle compartment whereby the character associated therewith is displayed and the driver advised that the proper signal has been displayed. As herein before stated, the front and rear signals are similar in construction and corresponding lamps thereof are included in the same circuit so that when the circuit is closed corresponding compartments of the front and rear signals are illuminated and like signals displayed, the same being readable from the side of the vehicle, or from in front or in the rear thereof.

What is claimed is:

A traffic signal having in combination with light transmitting means, a vertical signal plate in front of and adapted for illumination by said means, a vertical translucent plate in front of the signal plate, glare-obviating slats impervious to light in advance of the translucent plate forming a screen through which the signal plate may be viewed, and the slats being spaced apart and disposed with their greater width at a right angle to said plate.

In testimony whereof I affix my signature in presence of two witnesses.

SAMUEL F. DOUGLASS.

Witnesses:
 SYLVESTER ROMAY,
 SYLVESTER PASCHAL.